United States Patent [19]
Metzger

[11] 4,367,025
[45] Jan. 4, 1983

[54] BATTERY-POWER DISTRIBUTION APPARATUS

[75] Inventor: Lenard M. Metzger, Rochester, N.Y.

[73] Assignee: Eastman Kodak Company, Rochester, N.Y.

[21] Appl. No.: 290,997

[22] Filed: Aug. 7, 1981

[51] Int. Cl.³ .................... G03B 1/00; G03B 15/05
[52] U.S. Cl. .................................. 354/145; 307/17; 307/41; 354/173
[58] Field of Search ............... 354/145, 266, 173; 307/17, 38, 41

[56] References Cited
U.S. PATENT DOCUMENTS
3,846,812 11/1974 Biber ........................... 354/145

Primary Examiner—Michael L. Gellner
Attorney, Agent, or Firm—Dennis P. Monteith

[57] ABSTRACT

Power distribution circuitry for battery-powered apparatus having multiple energy-consuming loads, such as a camera having an electronic strobe flash unit and a film drive motor, enables the loads to be actuated independently without drawing battery current simultaneously. This limits peak battery current which can extend the useful life of the battery.

4 Claims, 2 Drawing Figures

BATTERY-POWER DISTRIBUTION APPARATUS

BACKGROUND OF THE INVENTION

1. Field of the Invention

This invention relates to circuitry for distributing battery power to multiple loads such as a film drive motor and an electronic strobe flash unit in a camera. More particularly, this invention relates to circuitry which distributes power to the loads in a manner that avoids supplying battery current to the loads simultaneously.

2. Description of the Prior Art

The electrical energy a battery delivers to a load equals battery power (battery voltage times battery current) multiplied by the time during which power is delivered. The battery's energy-delivery capacity is not constant, and varies as a function of battery load. If battery voltage is halved and current is doubled, its total energy-delivery capacity can change, even though battery power is the same. An excessively loaded battery, i.e. a battery whose current is increased beyond a particular level, can suffer a significant decrease in its total energy-delivery capacity.

Energy conservation and protection of a battery from excessive current drain are particularly important when the battery provides power for multiple loads. In U.S. Pat. No. 3,846,812, a battery is protected by locking one device out when another load is actuated, rather than energizing the loads independently.

There is also known in the prior art apparatus for using energy stored in a battery circuit that would otherwise dissipate through heat or charge leakage. U.S. Pat. Nos. 3,787,704 and 3,909,747 teach that energy stored in a capacitor or a transformer's magnetic field can be returned to a rechargeable battery.

SUMMARY OF THE INVENTION

The present invention controls the transfer of power from a battery to independently actuated loads such that the loads do not draw power from the battery simultaneously. The invention can be used advantageously in a battery-powered fully automatic camera.

In a preferred embodiment, a transformer comprises first and second winding means connected respectively to first and second energy-consuming loads. Switch means, coupling the transformer to the battery, has (1) a first condition wherein a first voltage is developed across said first and second winding means as energy is drawn from the battery and stored in the transformer, and (2) a second condition wherein a second voltage is developed across said first and second winding means in response to the interrupting of the drawing of battery energy. First and second voltage-sensitive means couple said first and second winding means, respectively, to the first and second loads. The first voltage-sensitive means, in response to the first voltage, causes the first winding means to deliver energy to the first load. The second voltage-sensitive means, in response to the second voltage, causes the second winding means to deliver energy to the second load.

The present invention and its objects and advantages, will become more apparent in a detailed description of preferred embodiments presented below.

DESCRIPTION OF THE DRAWING

In detailed descriptions of preferred embodiments of the invention presented below, reference is made to the accompanying drawing, in which.

DESCRIPTION OF THE PREFERRED EMBODIMENTS

Because cameras and electronic strobe flash units are well known, the present description will be directed in particular to elements forming part of, or cooperating more directly with apparatus in accordance with the present invention. It is to be understood that camera and flash unit elements not specifically shown or described may take various forms well known to those having skill in the art. In the following descriptions similar parts are identified by the same numbers from one embodiment to the next.

Figure 1:
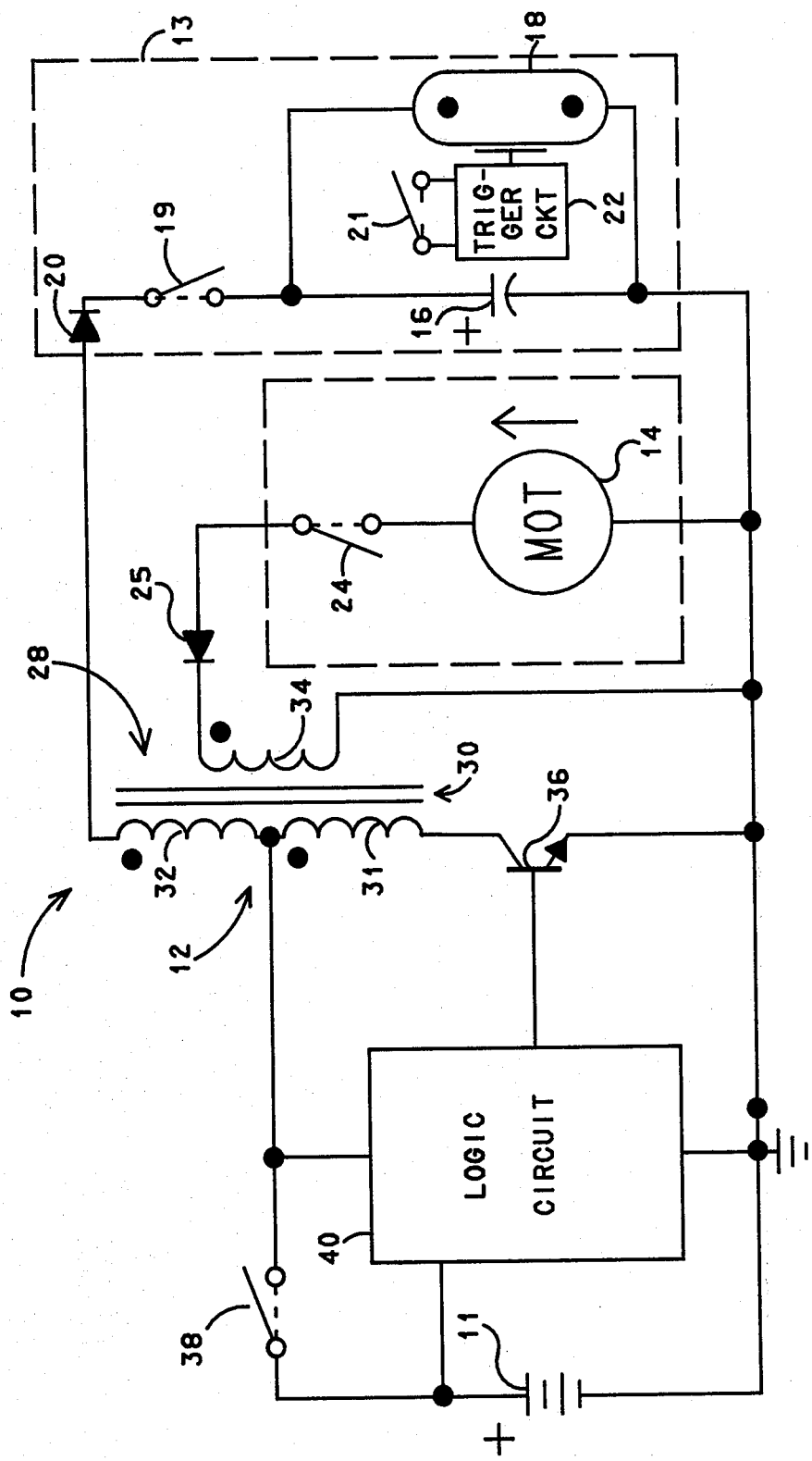
FIG. 1 is a diagram of a circuit according to the present invention for distributing power to an electronic strobe flash unit and a film drive motor.

Referring to FIG. 1, there is shown a camera 10 having a battery 11 and circuitry 12, which, in accordance with the invention, supplies power to two independently actuated loads such that the loads do not draw power from the battery 11 simultaneously. An electronic strobe flash unit 13 and a film drive motor 14 constitute energy-consuming loads for the battery 11.

The flash unit 13 includes a storage capacitor 16, a flash tube 18, a normally open switch 19 and a serially connected diode 20 connected to the circuitry 12 for charging the capacitor 16, and a normally open trigger switch 21, which causes a circuit 22 to trigger the flash tube when the switch 21 is closed. The switch 19 can be closed by a camera operator when the camera 10 is to be used in a flash exposure mode. By means well known in the photographic art, the switch 21 can be closed when a camera shutter (not shown) opens to effect an exposure. When the flash tube 18 is triggered, the capacitor 16 discharges through it, thereby producing a high intensity flash.

The film drive motor 14 is controlled by a normally open switch 24 serially connected to a diode 25. The switch 24 may be actuated in response to return movement of a shutter release button (also not shown) after an exposure is made or it may be actuated in any other suitable manner well known in the photographic art. In a presently preferred embodiment, it is desirable that the switch 24 is closed for an interval which is sufficient to allow the motor 14 to advance film to properly position an unexposed film frame. This interval can be approximately 2 or 3 seconds.

A DC to DC converter 28 includes a transformer 30 having a primary winding 31, a voltage step-up winding 32, and a secondary winding 34. As indicated by the enlarged dots, the windings 31, 32 and 34 are wound in the same direction. Thus, at any instant of time, voltages across the transformer's windings are the same polarity. The collector-emitter path of an oscillating NPN transistor 36 is connected to form a series circuit with the battery 11, a normally open power switch 38 and the primary winding 31. The switch 38 can be closed in reponse to actuation of a camera shutter release button (not shown) by a camera operator.

A logic circuit 40 is arranged to supply a train of positive voltage pulses to the base electrode of the transistor 36. Each pulse causes the transistor 36 to conduct.

The logic circuit 40 may take various forms, as will be apparent to one skilled in the art. In a presently preferred embodiment, circuit 40 operates as a variable frequency oscillator of the type disclosed in commonly assigned U.S. Pat. No. 4,272,806, issued on June 9, 1981 to the present inventor L. M. Metzger, the disclosure of which is incorporated herein by reference. The circuit 40 operates the converter 28 dynamically in accordance with the condition of the battery 11, to improve the efficiency with which energy is transferred from the battery and stored in the transformer 30.

The circuit 40 controls the converter 28 when the switch 38 is closed. By means well known in the DC to DC converter art, the converter 28 produces a series of alternating voltage pulses across the transformer's windings as a function of the state of the transistor 36. When the transistor 36 is on, these voltages are positive with respect to ground, and they are negative relative to ground when the transistor 36 is off.

When the winding voltages are positive, the diode 25 is reverse biased by the voltage across the secondary winding 34. Power is thereby blocked from being supplied to the motor 14. On the other hand, the voltage across the step-up winding 32 is positive at the anode of the diode 20. As long as this voltage is greater than the voltage across the capacitor 16, the diode 20 is forwardly biased, and thereby conducts. The conducting of the diode 20 causes the capacitor 16 to charge. The converter 28 is arranged so that the positive voltage pulses across the step-up winding 32 charge the capacitor 16 to approximately 350 volts.

When the winding voltages are negative, the diode 20 is reverse biased, and charging current is blocked from the capacitor 16. However, the negative voltage pulse across the winding 34 cause the diode 25 to be biased forwardly. Thus, the diode 25 is caused to conduct, as long as the switch 24 is closed. The conducting of the diode 25 causes the energizing of the motor 14, for advancing film through the camera 10.

Accordingly, the converter 28 stores energy in the transformer 30 when the transistor 36 is conducting. At the same time, the converter 28 transfers stored energy through the winding 32 to the capacitor 16. When the transistor 36 is not conducting, the converter 28 transfers stored energy through the secondary winding 34 to the motor 14.

Figure 2:
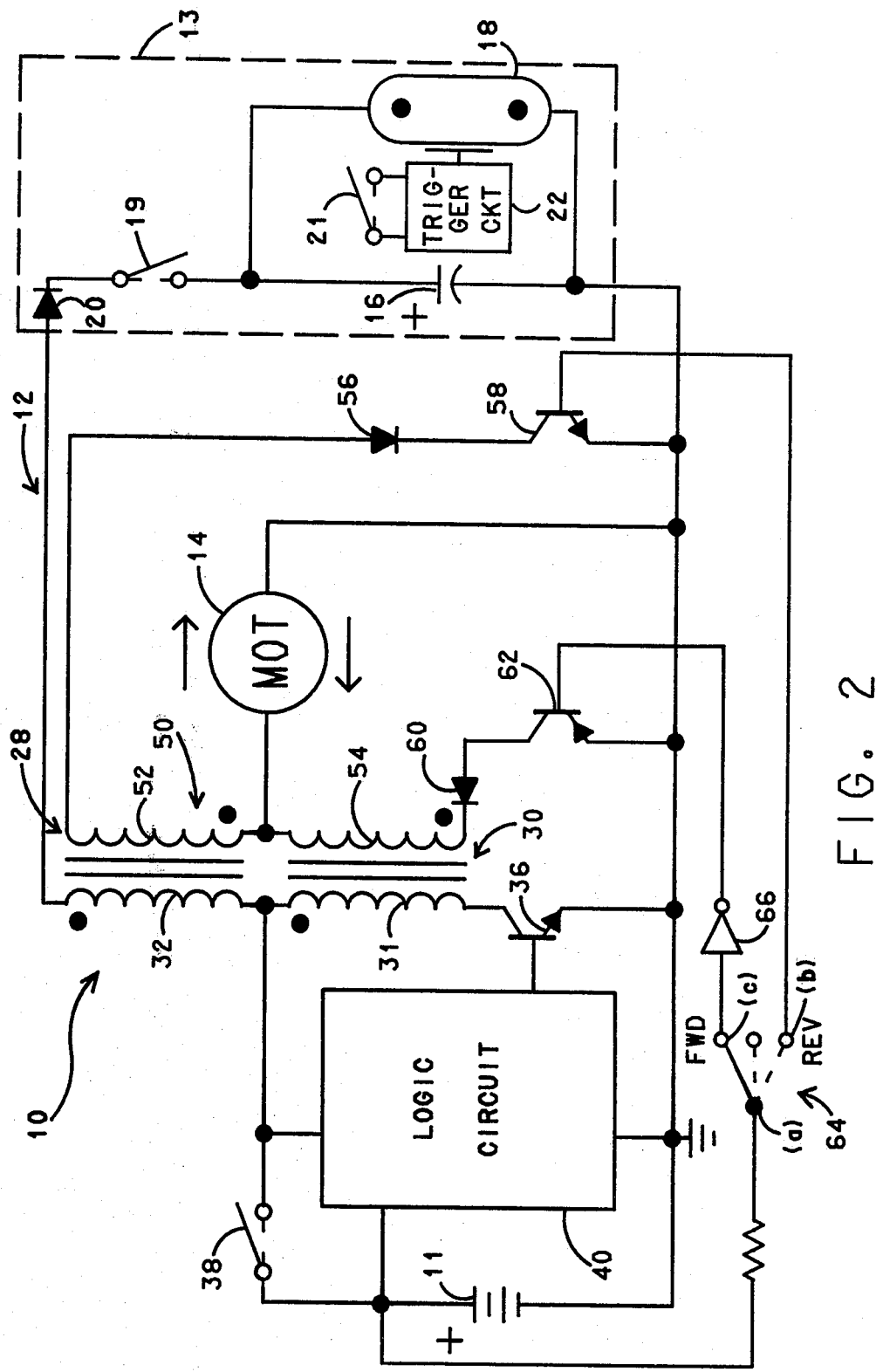
FIG. 2 is a diagram of a power distribution circuit according to the present invention in which the film drive motor can be driven in forward and reverse directions.

In the embodiment shown in FIG. 2, a secondary winding 50 of the transformer 30 is formed of two serially connected winding sections 52 and 54, to which the motor 14 is connected at their common junction. As indicated by the enlarged dots, the windings 52 and 54 are wound in a direction which is opposite the direction of the windings 31 and 32. Thus, the polarity of the voltages across the windings 52 and 54 is opposite the polarity of the voltages across the windings 31 and 32.

The winding 52 and the motor 14 form a circuit with a diode 56, and an NPN transistor 58. The winding 54 and the motor 14 form a circuit with a diode 60, and a PNP transistor 62.

The (a) contact of a switch 64 is connected to the battery 11, which supplies base electrode voltage for turning the transistors 58 and 62 on. The (b) contact of the switch 64 is connected to the base of transistor 58, and the (c) contact is connected to the base of transistor 62 through an inverter 66. Thus, when the (a) contact is connected to the (c) contact, transistor 62 is forwardly biased, and when the (a) contact is connected to the (b) contact, transistor 58 is forwardly biased. For a reason made apparent hereinafter, the switch 64 is also arranged so that both the contact (b) and the contact (c) can be connected to the contact (a) at the same time, so the transistors 58 and 62 can conduct simultaneously.

When battery current flows into the winding 31, the voltage induced across the winding 50 is negative with respect to ground. This voltage reverse biases both the diode 56 and the diode 60, which prevent the voltages across the windings 52 and 54 from damaging respectively the transistors 58 and 62. On the other hand, when battery current flows, the voltage across the winding 32 biases diode 20 into conduction, which causes the capacitor 16 to charge when switch 19 is closed.

When battery current through the transistor 36 is terminated, the polarity of the voltage across the winding 50 reverses, thus forwardly biasing both the diode 56 and the diode 60. The motor 14 is driven in the forward direction to advance film, when the contact (a) of switch 64 is connected to the contact (c). On the other hand, the motor 14 is driven in the reverse direction when the contact (a) is connected to the contact (b).

When the switch 64 is set so that battery voltage is applied to both the transistors 58 and 62, the windings 52 and 54 are effectively short-circuited and no power is transferred to the motor 14. The shorting of both sections of the secondary winding 50 through forwardly biased transistors 58 and 62 is advantageous in that when the motor is not actuated, the transistors 58 and 62 provide a low resistance path for the high voltages across the windings of the transformer 30. This path protects the transistor 36 from breakdown.

The invention is particularly advantageous when a low-voltage battery is the power source and one of its loads is an electronic strobe flash unit, because a DC to DC converter would be required to develop the voltage necessary to fire the flash tube.

Furthermore, battery current is limited by the saturation current of the converter's transformer. This maximum current is, of course, less than if battery current were supplied to a flash unit, having a converter, and a film-drive motor simultaneously.

A further advantage of the invention arises when one of the loads is a motor, because power is supplied to the motor at voltages greater than the battery's voltage. Motors operating at higher voltages are generally more efficient. Furthermore, the motor 14 uses energy stored in the transformer 30 while the transistor 36 is off. Thus, the motor 14 uses energy that otherwise is dissipated in the transformer 30 and other elements of the circuit when the DC to DC converter switches on and off.

The embodiment in FIG. 2 is preferable for use in apparatus, that requires a reversible motor, such as a camera, wherein film is moved in both forward and reverse directions. In the embodiment of FIG. 1 a reversible film drive device could be implemented by providing alternate drive linkages or other mechanical means, as is well known. Because the reversible film drive is implemented electrically in FIG. 2, it is possible to employ a simpler, more compact film drive mechanism.

The invention has been described in detail with particular reference to 2 presently preferred embodiments thereof, but it will be understood that variations and modifications can be effected within the spirit and scope of the invention.

What I claim is:

1. Electronic control circuitry interposable between a battery and first and second energy-consuming loads, said circuitry comprising:
   (a) a transformer comprising first and second winding means;
   (b) switch means, coupling said transformer to the battery, having (1) a first condition for drawing energy from the battery to store energy in said transformer, and (2) a second condition for interrupting the storing of energy in said transformer;
   (c) said transformer being arranged to develop first voltages across said first and second windings means as energy is stored in said transformer and to develop second voltages across said first and second winding means when the storing of energy is interrupted; and
   (d) first and second voltage-sensitive means, coupling said first and second winding means to the first and second loads, respectively, said first winding means and said first voltage-sensitive means being arranged with respect to each other to cause (1) said first winding means, in response to said first voltage-sensitive means responding to the first voltage, to deliver energy to the first load, and (2) said secondary winding means and said second voltage-sensitive means being arranged with respect to each other to cause said second winding means, in response to said second voltage-sensitive means responding to the second voltage, to deliver stored energy to the second load.

2. Apparatus in a camera for controlling the transfer of power from a battery to first and second loads, said apparatus comprising:
   transformer means having alternating first and second states;
   first circuit means including said transformer means and the first load, said first circuit means being responsive to the alternating states such that power is transferred to the first load when said transformer means is in its first state, and the transferring of power is interrupted when said transformer means is in its second state; and
   second circuit means including said transformer means and the second load, said second circuit means being responsive to the alternating states such that power is transferred to the second load in response to the interrupting of the transfering of power to the first load.

3. Apparatus in a camera for controlling the transfer of power from a battery to first and second loads, said apparatus comprising:
   a transformer having a step-up winding, a secondary winding and a primary winding, said primary winding being connected in series with the battery;
   switching means connected in series with the battery and said primary winding;
   means for rendering said switching means conductive and non-conductive to produce respectively alternately positive and negative voltages across each of said windings;
   first circuit means for connecting the first load in series with said step-up winding for transferring power from said step-up winding to the first load, said first circuit means including first rectifier means which is reverse biased to interrupt the transfer of power to the first load when said switching means is rendered non-conductive; and
   second circuit means for connecting the second load in series with said secondary winding for transferring power from said secondary winding to the second load, said second circuit means including second rectifier means which is reverse biased to interrupt the transfer of power to the second load when said switching means is rendered conductive.

4. Apparatus in a camera for controlling the transfer of power from a battery to first and second loads, said apparatus comprising:
   a transformer having primary winding means and a secondary winding, said primary winding means being connected to the battery;
   switching means connected in series with the battery and said primary winding means;
   means for rendering said switching means conductive and non-conductive to produce a pulsed voltage across said primary winding means;
   first circuit means for connecting the first load in series with said primary winding means for transferring power from said transformer to the first load, said first circuit means including first rectifier means for transferring power from said transformer to the first load when said switching means conducts, and for interrupting the transferring of power from said transformer to the first load when said switching means is non-conductive; and
   second circuit means, connecting the second load to said secondary winding, for transferring power from said transformer to the second load, said second circuit means including second rectifier means for transferring power from said transformer to the second load when said switching means is non-conductive, and for interrupting the transferring of power from said transformer to the second load when said switching means conducts.

* * * * *